(12) United States Patent
Pezzotti Robleto

(10) Patent No.: US 11,377,509 B2
(45) Date of Patent: Jul. 5, 2022

(54) ELASTOMERIC LATICES AND COATING COMPOSITIONS CONTAINING THE SAME

(71) Applicant: Consorcio Comex S.A. DE C.V., Cuidad de Mexico (MX)

(72) Inventor: Fabio Pezzotti Robleto, Cuidad de Mexico (MX)

(73) Assignee: Consorcio Comex S.A. DE C.V., Distrito Federal (MX)

( * ) Notice: Subject to any disclaimer, the term of this patent is extended or adjusted under 35 U.S.C. 154(b) by 127 days.

(21) Appl. No.: 16/607,908

(22) PCT Filed: Apr. 20, 2018

(86) PCT No.: PCT/IB2018/052741
§ 371 (c)(1),
(2) Date: Oct. 24, 2019

(87) PCT Pub. No.: WO2018/193409
PCT Pub. Date: Oct. 25, 2018

(65) Prior Publication Data
US 2021/0122939 A1    Apr. 29, 2021

Related U.S. Application Data

(60) Provisional application No. 62/488,246, filed on Apr. 21, 2017.

(51) Int. Cl.
| C08F 2/46 | (2006.01) |
| C08F 2/50 | (2006.01) |
| C08G 61/04 | (2006.01) |
| C08F 212/08 | (2006.01) |
| C09D 4/06 | (2006.01) |
| C09D 125/14 | (2006.01) |
| E04D 7/00 | (2006.01) |
| C08F 220/18 | (2006.01) |
| C08F 230/08 | (2006.01) |

(52) U.S. Cl.
CPC ...... *C08F 212/08* (2013.01); *C08F 220/1804* (2020.02); *C09D 4/06* (2013.01); *C09D 125/14* (2013.01); *E04D 7/00* (2013.01); *C08F 230/085* (2020.02)

(58) Field of Classification Search
CPC .............. C08F 2/46; C08F 2/50; C08G 61/04
USPC ................. 522/65, 6, 71, 1, 189, 184; 520/1
See application file for complete search history.

(56) References Cited

U.S. PATENT DOCUMENTS 5,063,091 A    11/1991  Martorano

FOREIGN PATENT DOCUMENTS

| CN | 1576283 | * | 2/2005 | |
| CN | 101168650 | * | 4/2008 | |
| CN | 101168650 A | | 4/2008 | |
| CN | 101475661 A | | 7/2009 | |
| CN | 103665277 A | | 3/2014 | |
| CN | 103819605 A | | 5/2014 | |
| CN | 105949842 A | | 9/2016 | |
| EP | 0401200 A1 | | 12/1990 | |
| WO | 2015158588 A1 | | 10/2015 | |
| WO | WO-2016090330 A1 | * | 6/2016 | ......... A01G 13/0268 |

OTHER PUBLICATIONS

Wu et al, CN 101168650 Machine Translation, Apr. 30, 2008 (Year: 2008).*
Raul et al, CN 1576283 Machine Translation, Feb. 9, 2005 (Year: 2005).*
Bai et al., "Commodity Science for Industrial Products", China Fortune Press, Jun. 2014, pp. 342-343. [Relevant for reasons stated in CN Office Action].

* cited by examiner

*Primary Examiner* — Jessica Whiteley
(74) *Attorney, Agent, or Firm* — Lucas P. Spano

(57) ABSTRACT

It is disclosed an elastomeric latex comprising (a) a copolymer, the copolymer comprising a reaction product of reactants comprising: (i) a mono-ethylenically unsaturated monomer having a glass transition temperature less than −20.deg. C.; (ii) a mono-ethylenically unsatured monomer having a glass transition temperature greater than 40.deg. C.; (iii) an N-methylol functional ethylenically unsaturated monomer; and (iv) an adhesion promoter comprising an ethylenically unsaturated alkoxysilane monomer; and (b) an aqueous medium.

19 Claims, No Drawings

ELASTOMERIC LATICES AND COATING COMPOSITIONS CONTAINING THE SAME

FIELD OF THE INVENTION

The present invention relates to latices for coating compositions. Such latices can have enhanced drying time and wet adhesion properties.

BACKGROUND OF THE INVENTION

Many structures are coated with roof coatings to protect the buildings from the damaging effects of weather and the environment, such as the sun, wind and water. When roof coatings are applied the users desire fast drying times, less than 24 hours. Without short drying times the user would find it difficult to apply multiple layers to previously applied layers to achieve a desired coating thickness. Furthermore, in case of rainy season, the film could be pilled-up or even damaged if the coating has not sufficiently dried.

To overcome these problems, a new elastomeric latex for roof coatings with enhanced wet adhesion and reduced drying times is sought.

SUMMARY OF THE INVENTION

An elastomeric latex comprising (a) a copolymer, the copolymer comprising a reaction product of reactants comprising: (i) a mono-ethylenically unsaturated monomer having a glass transition temperature less than −20.deg. C.; (ii) a mono-ethylenically unsaturated monomer having a glass transition temperature greater than 40.deg. C.; (iii) an N-methylol functional ethylenically unsaturated monomer; and (iv) an adhesion promoter comprising an ethylenically unsaturated alkoxysilane monomer; and (b) an aqueous medium.

DESCRIPTION OF THE INVENTION

The present invention is directed to an elastomeric latex that can be used in coating compositions and more specifically in roof coating compositions. The elastomeric latex may comprise a) a copolymer, the copolymer may comprise a reaction product of reactants comprising: i) a mono-ethylenically unsaturated monomer having a glass transition temperature less than −20.deg. C. and present in an amount of 55 to 85 wt. % (soft monomer); ii) a mono-ethylenically unsaturated monomer having a glass transition temperature greater than 40.deg. C. and present in an amount of 10 to 40 wt. % (hard monomer); iii) an N-methylol functional ethylenically unsaturated monomer present in amount of 1 to 10 wt. %; iv) an adhesion promoter comprising an ethylenically unsaturated alkoxysilane monomer present in an amount of 0.1 to 2 wt. %, all weight percents, based on total solids weight of the reactants; and b) an aqueous medium.

The term "Elastomeric" and like terms as used herein refer to materials that impart elasticity. "Elasticity" and like terms refer to the ability of a material to return to its approximate original shape or volume after the material has been deformed, such as for example stretched.

The term "latex" or "latex polymer" and like terms as used herein refer to polymer resulting from emulsion polymerization.

As indicated above, the copolymer of the elastomeric latex of the present invention can be prepared from a mixture of reactants that includes mono-ethylenically unsaturated monomer having a glass transition temperature less than −20.deg. C. (soft monomer). The mono-ethylenically unsaturated monomer can be a non-functional acrylic monomer(s). The term "non-functional monomer" means a monomer that is devoid of any group, e.g., hydroxyl, carboxyl, amide and amine that can undergo further reaction after polymerization of the monomer and includes cross-linking monomers. Non-limiting examples of suitable mono-ethylenically unsaturated monomers include butyl acrylate, isobutyl acrylate, isodecyl methacrylate, lauryl methacrylate, tridecylmethacrylate, 2-ethylhexyl acrylate, and combinations thereof.

The mono-ethylenically unsaturated monomer used to prepare the copolymer of the elastomeric latex can comprise 55 to 85 weight percent, as such 70 to 85 weight percent based on the total weight of the reactants.

In accordance with the present invention, the mixture of reactants used to prepare the copolymer of the elastomeric latex further includes a mono-ethylenically unsaturated monomer having a glass transition temperature greater than 40.deg. C. (hard monomer). Non-limiting examples of suitable mono-ethylenically unsaturated monomers (hard monomers) include vinyl halides, alkenyl aromatic monomers (styrene, p-methyl styrene, o-methyl styrene, o,p-dimethyl styrene, o,p-diethyl styrene, isopropyl styrene, t-butyl styrene, o-methyl-p-isopropyl styrene, and mixture thereof), methacrylamide, non-functional methacrylics and combinations thereof.

The mono-ethylenically unsaturated monomer having a glass transition temperature greater than 40.deg. C. can be present in a range such as from 10 to 40 weight %, or from 10 to 30 weight %, based on the total weight of the reactants.

The reactants of the present invention can further include n N-methylol functional ethylenically unsaturated monomer. This functionality can be obtained using one of the following monomers: N-methylol acrylamide (NMAA) or N-methylol methacrylamide (NMMAA). The copolymer can comprise 1 to 10 weight percent, as such 1.5 to 5 weight percent based on the total weight of the reactants.

The reactants of the present invention can further include an adhesion promoter comprising an ethylenically unsaturated alkoxysilane monomer. Non-limiting suitable examples of an adhesion promoter include vinyl trimethoxysilane, vinyl triethoxysilane, vinyl-tris-(2-methoxyethoxy) silane or combinations thereof.

The adhesion promoter may be present in an amount of 0.1 to 2 wt. %, such as 0.1 and 1.9 wt. % based on the total weight of the reactants.

Apart from the monomers, as noted above, the elastomeric latex can comprise an aqueous medium and optionally a surfactant for polymerization. The solids content of the final latex can be 40 to 65 weight percent and the content of aqueous medium can be 35 to 60 wt. % based on the total weight of components of the elastomeric latex.

As used herein, an "aqueous medium" refers to a liquid medium comprising at least 50 weight % water, based on the total weight of the liquid medium. Such aqueous liquid mediums can comprise at least 60 weight % water, or at least 70 weight % water, or at least 80 weight % water, or at least 90 weight % water, or at least 95% water, based on the total weight of the liquid medium. The solvents that make up less than 50 weight % of the liquid medium include organic solvents. Non-limiting examples of suitable organic solvents include polar organic solvents e.g. protic organic solvents such as glycols, glycol ether alcohols, alcohols, and volatile ketones, glycol diethers, esters, and diesters. Other non-limiting examples of organic solvents include aromatic and aliphatic hydrocarbons.

The glass transition temperature (Tg) of the final elastomeric latex can be less than −5.deg. C., such as less than −9.deg. C. The Tg is determined following the American Standard Test Method 1356-03 by Differential Scanning calorimetry (DSC) using a model Q2000 equipped with a refrigerated cooling system and nitrogen as a purge gas made by TA Instruments (New Castle, Del.). The Tg of the latex particles described herein can help balance the coating hardness with flexibility and resistance to cracking or the mechanical stress caused by temperature variations on roofs. They also allow the latex particles to coalesce into a smooth film.

The elastomeric latex can be prepared by conventional emulsion polymerization techniques known to those skilled in the art, such polymerization techniques typically include a step to prepare the seed and a second step to prepare the final copolymer. The reaction can take place at a temperature from 70 to 90.deg. C.

The N-methylol functional ethylenically unsaturated monomer can be added with the other monomers in the second step. A pre-emulsion is prepared with aqueous medium, monomers, N-methylol functional ethylenically unsaturated monomer and emulsifiers. This pre-emulsion can be fed into the reactor in a range of 3 to 5 hours. At the same time, an initiator solution can be fed to catalyze the reaction.

An acid functional monomer can be optionally added to improve the stability of the emulsion. Non-limiting suitable examples of the acid functional monomer include acrylic acid, methacrylic acid, itaconic acid or combinations thereof. The acid functional monomer can be present in an amount of 0.5 to 3 weight percent based on the total weight of the reactants.

Generally, the latex comprises less than about 3 weight percent of the total of components of the latex, of at least one surfactant. The surfactant can be an anionic surfactant, a nonionic surfactant or a combination of two or more of these surfactants. Non-limiting suitable examples of anionic surfactants include alkylphenolethoxylated sulfates and sulfonates, fatty alcohol ether sulfates, alkylsulfates and sulfonates, fatty alcohol ether sulfates and combinations thereof. Non-limiting suitable examples of nonionic surfactants include alkylarylpolyether alcohols, alkylphenolethoxylates, alkylethoxylates, fatty alcohol ethoxylates, ethoxylated lauric alcohols ethyleneoxide/propylene oxide block copolymers, and combinations thereof.

The silane-based adhesion promoter can be part of the copolymer backbone via its vinyl group, and autocondensate and/or react with the substrate through the silanol groups generated by hydrolyzing the silane groups. To improve the performance of the elastomeric latex the silanol groups can be located near to the surface or at the surface of the latex particles. For this purpose, the adhesion promoter can be included in the elastomeric latex in the second step of the polymerization process, at the beginning of the polymerization stage, during the polymerization stage or near to the end of the polymerization stage.

The elastomeric latex may optionally include a photoinitiator to promote surface cross-linking and to enhance dirt pick-up resistance. Non-limiting suitable examples of the photoinitiator include aromatic ketones as benzophenone and its derivatives, isopropylthioxantone, hydroxyalkylphenone, benzildimethylketal, alkyl-benzoin ethers, acetophenone or combinations thereof. The photoinitiator can be present in an amount less than 5 weight percent based on the total components of the latex.

Compared with latices of the prior art (having Tg≤−28.deg. C.), the elastomeric latex of the present invention has a higher Tg (<−5.deg. C.), due to an increase of the hard mono-ethylenically unsaturated monomer content, and a decrease in the soft mono-ethylenically unsaturated monomer content. The rise in the Tg implies an increase in the mechanical resistance of a film formed after curing the elastomeric latex.

It is believed that the moieties resulting of the grafted silane groups can react and form covalent bonds with inorganic substrates, and/or autocondensate to form a tridimensional polymer network with stable Si—O—Si linkages, improving substrate adhesion. This might constitute a first crosslinking mechanism of the elastomeric latex.

In acid conditions, the N-methylol functional ethylenically unsaturated monomer self-condensates at room temperature, which may constitute a second cross linking mechanism.

A photoinitiator may be optionally added to the elastomeric latex. When the latex is used to formulate a roof coating and the coating is applied, it is exposed to UV light. It is believed that the combination of UV light with the photoinitiator yields a mechanism that leads pendant groups of the soft mono-ethylenically unsaturated monomer and/or the hard mono-ethylenically unsaturated monomer at the surface of the latex particles to form free radicals that, for instance, react in such a way that surface crosslinking is achieved. As a consequence, a non-tacky and a hard polymer film can be obtained in rather short times.

The combination of the abovementioned crosslinking mechanisms with the adhesion promoter, and the related copolymer lead to an elastomeric latex that can be employed to formulate coating compositions with enhanced wet adhesion and reduced drying times.

The commercial resins ACRONAL MX3250™ and PRIMAL EC 3019R™ (also named Rhoplex EC3000™) are recommended for roof coatings with short drying time. The physicochemical analysis of these resins are shown in Table 1.

TABLE 1

Properties of elastomeric resins

| Property | ACRONAL™ MX3250* | PRIMAL EC 3019R™/ RHOPLEX EC3000™ ** | Elastomeric latex of the invention |
|---|---|---|---|
| Tg, .deg. C. | −28 | −40 | <−5 |
| Brookfield viscosity, cP | 560 | ≈300 | 200 to 2200 |
| Solids contents, % | 55.81 | ≈55.00 | 40 to 65 |
| pH | 7.67 | 10.00 | 6.90 to 9.00 |
| Density g/cm³ | 1.037 | 1.013 | 1.01 to 1.05 |
| Particle size, nm (Vol avg) | — | — | 200 to 400 |

*Available from BASF, Ludwigshafen, Germany
*Available from DOW, Midland, MI

A coating composition with improved wet adhesion and reduced dry times according to the present invention can be prepared according the following procedure: (i) a pigment paste is processed in a vessel by adding water, at least one glycol, at least one dispersant, and at least one antifoaming agent, and mixed for approximately 2 to 10 minutes at 250 RPM using a cowles blade attached to a dissolver. Following the mixing, at least one pigment and at least one filler can be added to the vessel. Once added, the paste can be dispersed for approximately 5 to 20 minutes at 400 RPM. Biocides can optionally be added to the pigment paste; (ii) to prepare the final coating, additional water, the elastomeric latex of the present invention, at least one dispersant, and at least one thickener can be added to the pigment paste. the components can be mixed at 700 RPM for 3 to 10 minutes; finally a neutralizing solution and biocides can be added to the mixture.

The elastomeric latex can be present in the roof coating formulation in an amount of 15 to 70 weight percent based on the total components of the formulation. The amount of the polymeric latex may be adjusted in order to modulate the wet adhesion and drying time for the desired properties of the coatings. Likewise the elastomeric latex can be blended with commercial elastomeric resins.

An aqueous medium can present in the coating composition in an amount of 20 to 45 weight percent, such as 25 to 40 weight percent based on the total components of the coating composition.

The coating composition of the present invention may include at least one glycol component. Non-limiting examples of a suitable glycol include diethylene glycol, monoethylene glycol, propylene glycol, neopentyl glycol and combinations thereof. The glycol can be present in an amount of 0.1 to 3 weight percent, such as 0.4 to 2 weight percent based on the total components of the coating composition.

The coating composition of the present invention may include at least one dispersant. Non-limiting suitable examples of a suitable dispersant include polycarboxylic acid dispersants, salt of polycarboxylic dispersants, water-based acrylic emulsion dispersants, hydrophobic dispersant and combinations thereof. The dispersant can be present in an amount of 0.05 to 1 weight percent, such as 0.05 to 0.8 weight percent based on the total components of the coating composition.

The coating composition of the present invention may include at least one antifoaming agent. Non-limiting suitable examples of an antifoaming agent include mineral oil based defoamers, silicone based defoamers, vegetable oil based defoamers, and combinations thereof. The antifoaming agent can be present in an amount of 0.05 to 1 weight percent, such as 0.05 to 0.8 weight percent based on the total weight of the components of the coating composition.

The coating composition of the present invention may include at least one thickener. Non-limiting suitable examples of a thickener include cellulosic thickeners, hydrophobically modified alkali swellable emulsion thickeners, non-ionic urethane rheology thickeners, and combinations thereof. The thickener may be present in an amount of 0.1 to 3 weight percent, such as 0.5 to 2 weight percent based on the total weight of the components of the coating composition.

The coating composition of the present invention may include at least one pigment. Non-limiting suitable examples of pigments include titanium dioxide, red iron oxide, zinc oxide, and mixtures thereof. The at least one pigment may be present in an amount of 0.1 to 4 weight percent, such as 0.5 to 3.5 weight percent, based on the total weight of the components in the coating composition.

The coating composition of the present invention may include at least one filler. Non-limiting suitable examples of fillers include calcium carbonate, hydrous kaolin, barite, bentonite, and mixtures thereof. The filler may be present in an amount of 10 to 40 weight percent, such as 10 to 35 weight percent, based on the total weight of the components in the coating composition.

The coating composition of the present invention may include at least one light filler. Non-limiting suitable examples of light fillers include expanded perlite, expanded polyacrylonitrile, low density aluminum hydroxide, nepheline syenite, micro glass bubbles, ceramic bubbles and mixtures thereof. The light fillers can be present in an amount 0.1 to 2 weight percent, such as 0.3 to 1 weight percent based on the total weight of the components of the coating composition.

Coating composition can be optionally formulated, wherein the color of the coating film shifts when exposed to UV light to indicate that the film has dried, additionally it can help to prevent confusion when a second layer of the coating is to be applied. For example the coating composition can be formulated such that the color can shift from a blue to white color.

The coating compositions of the present invention can be applied to a substrate by conventional techniques such as spraying, brushing and roll coating. The coating compositions can be applied to any substrates known in the art, for example, architectural substrates, such as roofs, bricks, vinyl siding, automotive substrates, marine substrates, industrial substrates, packaging substrates, wood flooring and furniture, apparel, electronics including housings and circuit boards and including consumer electronics such as housings for computers, notebooks, smartphones, tablets, televisions, gaming equipment, computer equipment, computer accessories, MP3 players, glass and transparencies, sports equipment including golf balls, and the like. Accordingly, the present invention is further directed to a substrate coated at least in part with any of the coating compositions described above. These substrates can be, for example, metallic or non-metallic. Metallic substrates include tin, steel, tin-plated steel, chromium passivated steel, galvanized steel, aluminum, aluminum foil. Metal sheet as used herein refers to flat metal sheet and coiled metal sheet, which is coiled, uncoiled for coating and then re-coiled for shipment to a manufacturer. Non-metallic substrates include polymeric, plastic, polyester, polyolefin, polyamide, cellulosic, polystyrene, polyacrylic, poly(ethylene naphthalate), polypropylene, polyethylene, nylon, EVOH, polylactic acid, other "green" polymeric substrates, poly(ethyleneterephthalate) ("PET"), polycarbonate, polycarbonate acrylobutadiene styrene ("PC/ABS"), polyamide, wood, veneer, wood composite, particle board, medium density fiberboard, cement, stone, glass, paper, cardboard, textiles, leather both synthetic and natural, and the like.

Wet Adhesion Testing

Coating compositions were prepared including the elastomeric latices according to the present invention or commercial resins mentioned in Table 1. They were formulated following the aforementioned procedure. The wet and dry adhesion properties of the roof coatings were evaluated following the established procedure in the Mexican standard number NMX-C-450-ONNCCE-2010 (Building industry—elastomeric waterproofing—specification and testing method). The results of the testing are summarized in Table 2

TABLE 2

Properties of roof coatings with elastomeric resins

| Property | ACRONAL MX 3250 ™* | PRIMAL EC-3019 R ™** | Elastomeric latices of the invention |
|---|---|---|---|
| Brookfield Viscosity, cp | 18800 | 37560 | 17300-20100 |
| Stormer Viscosity, KU | 110.4 | 128.9 | 105-109 |
| Wet adhesion lb/in | 1.10 | 1.48 | Up to 4.16 |
| Dry adhesion lb/in | 3.5 | 4.9 | Up to 9.3 |

The coating compositions were formulated with the elastomeric latex of the invention yielded wet adhesion values up to 4.58 lb/in and dry adhesion values up to 9.3 lb/in. Coating compositions formulated with commercial resins yielded wet adhesion values up to 1.48 lb/in and dry adhesion values up to 4.9 lb/in.

Drying Time Testing Under Controlled Conditions

The drying time for early rain resistance of coating compositions formulated with the elastomeric latex of the present invention were evaluated under controlled conditions according the following method:

Two separate carts equipped with a shower and UV-light source respectively, and dried and free of dust fiber-cement panels (complying ASTM C-1186) of 15×15 cm or similar were placed inside a controlled conditions room and the desired conditions of temperature and humidity for the test were set. The carts and the panels were left at these conditions for at least one hour to acclimate them to the temperature of the room.

The fiber-cement panels were removed from the room and, with help of a spatula, coating compositions samples were applied with the equivalent of a painting performance of 0.5 m²/L. The substrate was positioned to be as flat as possible in order to have a film with uniform thickness across the substrate.

Each coated fiber-cement panel was placed inside the room once more, this time on the cart with the UV light source turned ON or OFF, depending on the interest of the analyst. That time is registered as $t_0$.

When a dried surface was observed (i.e. when the gloss is lost), the panel was removed from the UV-light source cart and placed on the sample holder inside of the shower cart. This time is registered as $t_1$. The water flow was opened and set to 3 l/min and the water drops fell directly onto the panel (the sample holder was set to 45.deg.) for 10 seconds. The water flow was closed and the surface of the panel was examined for failures such as: a) film damage, b) whitening and/or c) loss of pigment. All failures observed were registered. If the sample withstood the falling water, the time $t_1$ was registered as free of failure. The remaining panels were measured using the same criteria.

The drying time for early rain resistance was registered as an interval where the first time corresponds to a failure and the second to an undamaged film. It was desired to have a difference between t1 (A) and t1 (B) be under 5 minutes.

Coating compositions formulated with the elastomeric latex of the present invention having a drying time period in the range of 15 minutes to 1.5 hours (depending on the ambient conditions) were observed.

Illustrating the invention are the following examples that are not to be considered as limiting the invention to their details. All parts and percentages in the examples, as well as throughout the specification, are by weight unless otherwise indicated.

EXAMPLES

Examples 1-2: Seed Emulsion

Example 1

A seed emulsion was prepared as follows. 0.3693 phm (parts per hundred parts monomer) of nonionic ethoxylated nonylphenol surfactant (B) and 4.1099 phm of anionic ethoxylated nonylphenol-sulfate ammonium salt surfactant (C) were dissolved in 244.5547 phm of deionized water (A) to prepare a first surfactant solution (1). The surfactant solution was stirred until a clear solution with no suspended gels was obtained. The surfactant solution was transferred to a 2 L glass reactor and the agitation was set at 160 RPM. The recirculation of the isothermal bath was set at 85.deg.-87.deg. C.

A second surfactant solution (2) including 0.2453 phm of nonionic ethoxylated nonylphenol surfactant (E), an 2.7239 phm of anionic ethoxylated nonylphenol-sulfate ammonium salt surfactant (F), and 38.0430 phm of deionized water (D) was prepared. The second solution was transferred to a separated preemulsion/monomer glass container.

Styrene monomer (G), 64.9865 phm was transferred slowly to the monomer glass container under agitation, and mixed with the second surfactant solution. Upon completion n-butyl acrylate monomer (H), 33.5161 phm, and methacrylic acid monomer (I), 1.4973 phm were added to the second surfactant solution following the same process than styrene monomer (G). The stirring rate was kept moderate to avoid foam formation, until a stable pre-emulsion was obtained (i). 27.52 g of pre-emulsion were separated (ii).

In a proper glass beaker, an initiator solution (3) was prepared dissolving 0.3996 phm of ammonium persulfate (K) in 1.8020 phm of deionized water (L) Ammonium persulfate (M), 0.2155 phm, was dissolved in 8.1832 phm of deionized water (N) to prepare an initiator solution (4).

Once the reactor temperature reached 75.deg. C., the pre-emulsion (ii) was transferred to the reactor, with agitation rate at 160 RPM. After the reactor temperature reached 80.deg. C. the solution (3) was transferred to the reactor. The reactor temperature was kept between 80-82.deg. C. for 25 minutes at 160 RPM.

Next, the simultaneous feeding to the reactor of pre-emulsion (i) and initiator solution (4) begun. These feedings were done over 90 and 100 minutes periods, respectively. Upon completion the reaction mixture was held at 85±3.deg. C. for 60 minutes, at 180 RPM.

After such period, the reactor was cooled at 35.deg. C., and a neutralizing solution (5) including 3.4719 phm of deionized water (P) and 0.9222 phm of ammonium hydroxide (25 wt. %, aqueous) (O) was fed to the reactor over a 30 minutes period. Upon completion water (Q), 0.7835 phm, and biocide (R), 0.1632 phm, were added and stirred for 10 minutes. The obtained seed was discharged through a 400 mesh to determine grit.

Example 2

A seed emulsion was prepared as follows. 0.3693 phm of nonionic ethoxylated lauric alcohol surfactant (B) and 4.1099 phm of anionic fatty alcohol ether sulfate sodium salt surfactant (C) were dissolved in 244.5547 phm of deionized water (A) to prepare a first surfactant solution (1). The surfactant solution was stirred until a clear solution with no suspended gels was obtained. The surfactant solution was transferred to one 2 L glass reactor and the agitation in the reactor was set at 160 RPM. The recirculation of the isothermal bath was set at 85.deg. C.

A second surfactant solution (2) including 0.2453 phm of nonionic ethoxylated lauric alcohol surfactant (E), an 2.7239 phm of anionic fatty alcohol ether sulfate sodium salt surfactant (F), and 38.0430 phm of deionized water (D) was prepared. The second solution was transferred to a separated preemulsion/monomer glass container.

Styrene monomer (G), 64.9865 phm was transferred slowly to the monomer glass container under agitation, and mixed with the second surfactant solution. Upon completion n-butyl acrylate monomer (H), 33.5161 phm, and methacrylic acid monomer (I), 1.4973 phm were added to the second surfactant solution following the same process than styrene monomer (G). The mixing was kept at moderate rate to avoid foam formation, until a stable pre-emulsion was obtained (i). 27.52 g of pre-emulsion were separated (ii).

In a proper glass beaker, an initiator solution (3) of 0.3996 phm of ammonium persulfate (K) in 1.8020 phm of deionized water was prepared (L) Ammonium persulfate (M), 0.2155 phm, was dissolved in 8.1832 phm of deionized water (N) to prepare an initiator solution (4).

After the reactor temperature reached 75.deg. C., the pre-emulsion (ii) was transferred to the reactor with agitation rate at 160 RPM. After the reactor temperature reached 80.deg. C., the solution (3) was transferred to the reactor. The reactor temperature was kept between 80-82.deg. C. for 25 minutes at 160 RPM.

Next, the simultaneous feeding to the reactor of the pre-emulsion (i) and initiator solution (4) begun. These feedings were done over 90 and 100 minutes periods, respectively. Upon completion the reaction mixture was held at 85±3.deg. C. for 60 minutes, at 180 RPM.

After such period, the reactor was cooled at 35.deg. C., and a neutralizing solution (5) including 3.4719 phm of deionized water (P) and 0.9222 phm of ammonium hydroxide (25% weight, aqueous) (O) was fed to the reactor over a 30 minutes period. Upon completion, water (Q), 0.7835 phm, and biocide (R), 0.1632 phm, were added and stirred for 10 minutes. The obtained seed was discharged through a 400 mesh to determine grit.

Examples 3-5: Elastomeric Lattices

Example 3

A surfactant solution (1) was prepared dissolving 0.090 phm of nonionic surfactant (B) and 1.005 phm of anionic surfactant (C) in 13.980 phm of deionized water (A). The surfactant solution was stirred until a clear solution with no suspended gels was obtained. The solution was transferred to a monomer/pre-emulsion glass container.

N-butyl acrylate monomer (E) was transferred slowly to the monomer glass container under agitation, and mixed with the surfactant solution (1). Upon completion, styrene monomer (D), crosslinker (F) (NMAA or NMMAA) and methacrylic acid monomer (G) were added to the surfactant solution (1) following the same process than N-butyl acrylate monomer (E). In order to prepare a pre-emulsion (i).

A solution (2) was prepared dissolving 0.013 phm of nonionic surfactant (J), 0.150 phm of anionic surfactant (K), 0.083 phm of sodium carbonate (L), and 0.071 phm of sodium bicarbonate (M) in 51.754 phm of deionized water (I). This mixture was stirred until a clear solution with no suspended gels was obtained. The solution (2) was transferred to a 2 L glass reactor. The agitation in the reactor was set at 150 RPM and water recirculation of the isothermal bath was set at 88-90.deg. C. When the reactor reached 75.deg. C., the emulsion seed prepared in Example 1 was transferred to the reactor.

In a proper glass beaker, 0.246 phm of ammonium persulfate (O) was dissolved in 0.960 phm of deionized water (P) to prepare the initiator solution (3). In a proper glass beaker, 0.308 phm of ammonium persulfate (Q) was dissolved in 4.237 phm of deionized water (R) to prepare the initiator solution (4).

When the reactor reached 82.deg. C., the initiator solution (3) was transferred to the reactor. Upon completion the pre-emulsion (i) and the initiator solution (4) was simultaneously fed to the reactor over a four hours period; in the prescribed time, the reactor temperature was kept between 83-87.deg. C.

At time t=180 minutes of the feed of pre-emulsion (i) and the initiator solution (4) to the reactor, agitation in the monomer glass container was started. At that time adhesion promoter monomer (XX1) over the surface of the remaining pre-emulsion (i) in the emulsion glass container, it was added using a proper syringe; using the same syringe 1.086 phm of water XX2 was added to the monomer glass container. Upon completion, the blend was mixed for 3 minutes.

After finishing both the pre-emulsion and initiator solution (4) feed, the reactor temperature was kept between 83-87.deg. C. for 30 minutes.

Oxidant (5) and reductor (6) solutions were prepared by mixing: (i) 0.094 phm of tert-butyl hydroperoxide (70 wt. %, aqueous) (S) with 1.340 phm of deionized water (T), and (ii) 0.069 phm of methanesulfinic acid-hydroxy, monosodium salt (U) with 1.340 phm of deionized water (V), respectively. After that, the reactor was kept for 30 minutes at 83-87.deg. C., solutions (5) and (6) were fed to the reactor over a 25 minutes period at 83-87.deg. C.

A solution (7) with 0.543 phm of deionized water (W) and 0.869 of ammonium hydroxide (38% weight, aqueous) (X) was prepared. After solutions (5) and (6) feeding had finished, the cooling of the reactor started, and simultaneously the solution (7) was fed to the reactor over a 20 minutes period. 0.136 phm of a solvent-dewaxed heavy paraffinic defoamer (Y) was added to the reactor when the temperature was below 35.deg. C.

A solution (8) containing 0.246 phm of benzophenone (Z) and 0.246 phm of xylene (Z1) was prepared. When the reactor temperature reached 35.deg. C., the solution (8) was dosed to the reactor. Upon completion, 0.083 phm of biocide (Z2) was added and the mixing was kept for 15 minutes. The elastomeric latex was discharged through a 400 mesh to determine grit.

Following the above-described process, three elastomeric latices were prepared with a theoretical Tg's value about of −21.deg. C. (according to Fox Equation); a summary of the components included in them is provided in Table 3.).

TABLE 3

| Elastomeric Latex | Theoret. Tg · deg. C. | Surfactants (B), (C), (J), (K) | Styrene (D) (phm) | N-butyl acrylate (E) (phm) | Methacrylic acid (G) (phm) | Cross-linker (F) | Cross-linker (phm) | Adhesion promoter | Adhesion promoter (phm) |
|---|---|---|---|---|---|---|---|---|---|
| 1 | −20.51 | APEO | 10.0 | 83.2 | 1.5 | NMMAA | 5.0 | 1 | 0.3 |
| Comparative a | −20.48 | APEO | 10.0 | 83.0 | 1.5 | NMMAA | 5.0 | 2 | 0.5 |
| Comparative b | −20.48 | APEO | 10.0 | 83.0 | 1.5 | NMMAA | 5.0 | 3 | 0.5 |

APEO surfactants: nonionic ethoxylated nonylphenol surfactant (B or J) and anionic ethoxylated nonylphenol surfactant (C or K)
Adhesion promoter:
1. Vinyltrimethoxysilane;
2. γ-methacryloxypropyl trimethoxysilane;
3. Methacrylamidoethyl-ethyleneurea Physicochemical properties of each elastomeric latex were measured and they are shown in Table 4.

TABLE 4

| Elastomeric Latex | Solids contents, % | Brookfield visc. cP | pH | Density, g/mL | Grit, ppm | Residual ammonium persulfate, ppm | Particle size, nm (Vol avg) | Mechanical Stability |
|---|---|---|---|---|---|---|---|---|
| 1 | 54.66 | 2,160 | 7.92 | 1.031 | 10 | 0-0.5 | 245 | OK |
| Comparative a | 54.17 | 260 | 7.63 | 1.035 | 29 | 0 | 324 | OK |
| Comparative b | 54.23 | 368 | 8.21 | 1.034 | 4 | 0 | 346 | OK |

Example 4

Following the process described in Example 3, eight elastomeric latices were prepared with theoretical Tg's value about of −16.deg. C. (according to Fox Equation). One of the latices included seed prepared in Example 2 instead of the seed prepared in Example 1. A summary of the components included in the eight elastomeric latices is provided in Table 5. Physicochemical properties of each elastomeric latex were measured and they are shown in Table 6.

TABLE 5

| Elastomeric Latex | Theoret. Tg · deg. C. | Surfactants (B), (C), (J), (K) | Seed (Example 1 or 2) | Styrene (D) (phm) | N-butyl acrylate (E) (phm) | Methacrylic acid (G) (phm) | Cross-linker (F) (phm) | Cross-linker (phm) | Adhesion promoter | Adhesion promoter (phm) |
|---|---|---|---|---|---|---|---|---|---|---|
| 2 | −16.10 | APEO | 1 | 16.0 | 79.1 | 1.5 | NMAA | 3.2 | 1 | 0.200 |
| 3 | −15.49 | APEO | 1 | 16.0 | 79.0 | 1.5 | NMMAA | 3.2 | 1 | 0.300 |
| 4 | −15.35 | APEO | 1 | 16.0 | 78.3 | 1.5 | NMMAA | 3.2 | 1 | 1.000 |
| 5 | −16.08 | APEO | 1 | 16.0 | 79.0 | 1.5 | NMAA | 3.2 | 1 | 0.300 |
| 6 | −15.78 | APEO | 1 | 16.0 | 77.5 | 1.5 | NMAA | 3.2 | 1 | 1.825 |
| 7 | −15.31 | LAEO | 2 | 17.2 | 79.0 | 1.5 | NMAA | 2.0 | 1 | 0.303 |
| Comparative c | −15.49 | APEO | 1 | 16.0 | 79.0 | 1.5 | NMMAA | 3.2 | 2 | 0.300 |
| Comparative d | −15.35 | APEO | 1 | 16.0 | 78.3 | 1.5 | NMMAA | 3.2 | 2 | 1.000 |

APEO surfactants: nonionic ethoxylated nonylphenol surfactant (B or J) and anionic ethoxylated nonylphenol surfactant (C or K)
LAEO surfactants: nonionic ethoxylated lauric alcohol surfactant (B or J), and anionic fatty alcohol ether sulfate sodium salt surfactant (C or K)
Adhesion promoter:
1. Vinyltrimethoxysilane;
2. γ-methacryloxypropyl trimethoxysilane;
3. Methacrylamidoethyl-ethyleneurea

TABLE 6

| Elastomeric Latex | Solids contents, % | Brookfield visc. cP | pH | Density, g/mL | Grit, ppm | Residual ammonium persulfate, ppm | Particle size, nm (Vol avg) | Mechanical Stability |
|---|---|---|---|---|---|---|---|---|
| 2 | 54.84 | 1,560 | 8.54 | 1.029 | 20 | 0-0.5 | 294 | OK |
| 3 | 54.88 | 452 | 6.95 | 1.030 | 50 | 0-0.5 | 290 | OK |
| 4 | 54.71 | 428 | 7.36 | 1.027 | 70 | 0-0.5 | 309 | OK |
| 5 | 54.50 | 1,100 | 7.73 | 1.031 | 58 | 0 | 287 | OK |
| 6 | 54.29 | 660 | 8.33 | 1.033 | 24 | 0 | 297 | OK |
| 7 | 54.77 | 664 | 7.04 | 1.032 | 148 | 0 | 294 | OK |
| Comparative c | 54.39 | 400 | 7.17 | 1.031 | 10 | 0-0.5 | 292 | OK |
| Comparative d | 54.60 | 468 | 7.21 | 1.030 | 70 | 0-0.5 | 302 | OK |

Example 5

Following the process described in Example 3, eight elastomeric latices were prepared with theoretical Tg's value about of −9.deg. C. (according to Fox Equation). Five of the latices included seed prepared in Example 2 instead of the seed prepared in Example 1. A summary of the components included in the eight elastomeric latices is provided in Table 7. Physicochemical properties of each elastomeric latex were measured and they are shown in Table 8.

TABLE 7

| Elastomeric Latex | Theoret. Tg · deg. C. | Surfactants (B), (C), (J), (K) | Seed (Example 1 or 2) | Styrene (D) (phm) | N-butyl acrylate (E) (phm) | Methacrylic acid (G) (phm) | Cross-linker (F) | Cross-linker (phm) | Adhesion promoter | Adhesion promoter (phm) |
|---|---|---|---|---|---|---|---|---|---|---|
| 8 | −7.58 | APEO | 1 | 23.4 | 71.3 | 1.5 | NMMAA | 3.5 | 1 | 0.250 |
| 9 | −9.18 | LAEO | 2 | 23.2 | 73.2 | 1.5 | NMAA | 2.0 | 1 | 0.150 |
| 10 | −9.14 | LAEO | 2 | 23.2 | 73.0 | 1.5 | NMAA | 2.0 | 1 | 0.303 |
| 11 | −9.25 | LAEO | 2 | 22.6 | 72.0 | 1.5 | NMAA | 2.0 | 1 | 1.818 |
| 12 | −8.90 | APEO | 1 | 22.9 | 72.1 | 1.5 | NMAA | 3.0 | 1 | 0.500 |
| 13 | −8.76 | APEO | 1 | 22.9 | 71.6 | 1.5 | NMAA | 3.0 | 1 | 1.000 |
| Comparative e | −9.25 | LAEO | 2 | 22.6 | 72.0 | 1.5 | NMAA | 2.0 | 2 | 1.818 |
| Comparative f | −8.76 | APEO | 2 | 22.9 | 71.6 | 1.5 | NMAA | 3.0 | 3 | 1.000 |

APEO surfactants: nonionic ethoxylated nonylphenol surfactant (B or J) and anionic ethoxylated nonylphenol surfactant (C or K)
LAEO surfactants: nonionic ethoxylated lauric alcohol surfactant (B or J), and anionic fatty alcohol ether sulfate sodium salt surfactant (C or K)
Adhesion promoter:
1. Vinyltrimethoxysilane;
2. γ-methacryloxypropyl trimethoxysilane;
3. Methacrylamidoethyl-ethyleneurea

TABLE 8

| Elastomeric Latex | Solids contents, % | Brookfield visc. cP | pH | Density, g/mL | Grit, ppm | Residual ammonium persulfate, ppm | Particle size, nm (Vol avg) | Mechanical Stability |
|---|---|---|---|---|---|---|---|---|
| 8 | 54.78 | 520 | 8.65 | 1.032 | 70 | 0-0.5 | 300 | OK |
| 9 | 54.94 | 496 | 7.31 | 1.030 | 140 | 0 | 289 | OK |
| 10 | 54.93 | 500 | 8.75 | 1.033 | 108 | 0 | 289 | OK |
| 11 | 54.49 | 452 | 8.62 | 1.031 | 124 | 0 | 288 | OK |
| 12 | 54.35 | 444 | 8.20 | 1.034 | 14 | 0 | 335 | OK |
| 13 | 54.26 | 360 | 8.27 | 1.033 | 0 | 0 | 352 | OK |
| Comparative e | 54.78 | 568 | 8.50 | 1.032 | 148 | 0 | 289 | OK |
| Comparative f | 54.75 | 972 | 7.93 | 1.033 | 88 | 0 | 376 | OK |

Example 6

Roof Coating

Nineteen roof coatings compositions were formulated following the next procedure. 200 grams of water (A), 5.36 grams of glycols mix (B), 3.25 grams of an ammonium polyacrylate-based dispersing additive (C) and 1.07 grams of a mineral oil based defoamer (D) were added in a metal vessel. They were then mixed for approximately 5 minutes at 250 RPM using a Disperset ST-1VE dissolver.

After mixing, 26.79 grams of Titanium Dioxide (E), 3.75 grams of expanded copolymer microspheres (F), and 294.74 of Calcium Carbonate (G) were slowly added to the metal vessel, the mix rate was proportional to the demand of the system. The addition lasted between 10 to 15 minutes. Once E, F and G were added, the obtained pigment paste (i) was dispersed for 10 minutes at 400 RPM.

In a plastic vessel, the pigment paste (i), 67.95 grams of water (H), 482.30 grams of elastomeric latex (I) prepared in Examples 3 to 5, and 0.8 grams of mineral oil based defoamer (J) were added. The mixture was dispersed at 700 RPM for 5 minutes using a Disperset ST-1VE dissolver.

In a 50 ml beaker, 7.00 grams of hydroxyethyl cellulose thickener (K) were mixed with 32.15 grams of water (L). The mixture was added to the plastic vessel and dispersed at 1000 RPM for 10 minutes or until the hydroxyethyl cellulose (K) lumps were dissolved.

Finally, 1.61 grams of ammonia solution (M) and 1.71 grams of biocide (5-chloro-2-methyl-4-isothiazolin-3-one and 2-methyl-4-isothiazolin-3-one) (N) were added to the plastic vessel at 1400 RPM, the obtained roof coating was dispersed for 5 more minutes.

The only difference between the nineteen roof coating compositions was the amount of water (L) and the amount and type of elastomeric latex (I). The amount of elastomeric latex (I) was varied in order to obtain coatings compositions with the same pigment volume concentration (PVC) despite the possible discrepancies of polymer density and solids of emulsion.

The wet and dry adhesion properties of the nineteen formulated roof coatings were evaluated following the established procedure in the Mexican standard number NMX-C-450-ONNCCE-2010 (Building industry—elastomeric waterproofing—specification and testing method). The Drying time for early rain resistance of the nineteen roof coatings formulated was evaluated following the test under controlled conditions aforementioned in the description. The results are summarized in Table 9.

TABLE 9

| Early Elastomeric Latex | Brookfield visc., cP | Stormer visc., KU | Density, g/mL | pH | Dry Adhesion lb/in | Wet Adhesion lb/in | Early Rain Resistance Time, min | Condition T, · deg. C. | Condition HR, % |
|---|---|---|---|---|---|---|---|---|---|
| 1 | 19,460 | 109 | 1.202 | 9.0 | 5.59 | 2.37 | 45:48-49:16 | 36.0 | 75 |
| 2 | 19,340 | 109 | 1.203 | 9.1 | 9.31 | 4.16 | 33:19-36:51 | 36 | 75 |
| 3 | 20,100 | 106 | 1.204 | 8.4 | 4.32 | 1.18 | 40:18-43:25 | 38 | 74 |
| 4 | 18,900 | 106 | 1.195 | 8.3 | 3.87 | 1.09 | 29:24-31:45 | 38 | 74 |
| 5 | 18,680 | 107 | 1.204 | 8.8 | 4.80 | 2.43 | 49:25-55:42 | 38 | 73 |
| 6 | 18,880 | 108 | 1.189 | 8.9 | 4.62 | 0.97 | 41:16-47:03 | 38 | 73 |
| 7 | 18,000 | 108 | 1.214 | 8.7 | 3.46 | 1.09 | 49:17-51:17 | 38 | 73 |
| 8 | 19,500 | 105 | 1.203 | 9.1 | 4.31 | 1.69 | 35:36-36:37 | 38 | 74 |
| 9 | 19,020 | 108 | 1.191 | 8.9 | 6.64 | 3.04 | 46:14-47:14 | 36 | 75 |
| 10 | 18,060 | 107 | 1.211 | 9.1 | 5.02 | 3.55 | 53:22-55:22 | 38 | 73 |
| 11 | 18,480 | 108 | 1.212 | 8.9 | 4.1 | 1.23 | 42:37-45:21 | 38 | 73 |
| 12 | 17,300 | 106 | 1.192 | 8.9 | 5.48 | 3.03 | 42:54-44:54 | 38 | 73 |
| 13 | 18,400 | 108 | 1.214 | 9 | 4.54 | 1.98 | 53:12-56:12 | 36 | 75 |
| Comparative a | 17,360 | 108 | 1.141 | 8.7 | 2.34 | 0.31 | 49:58-52:58 | 36.0 | 75 |
| Comparative b | 28,120 | 116 | 1.185 | 8.0 | 2.79 | 0.61 | 49:17-50:37 | 38 | 73 |
| Comparative c | 20,100 | 107 | 1.189 | 8.3 | 2.50 | 0.89 | 1:00:08-1:01:43 | 38 | 74 |
| Comparative d | 19,700 | 106 | 1.192 | 8.4 | 1.87 | 0.33 | 48:21-50:21 | 38 | 74 |
| Comparative e | 19,800 | 109 | 1.214 | 9 | 2.20 | 0.26 | 50:04-56:21 | 38 | 73 |
| Comparative f | 17,040 | 106 | 1.187 | 9 | 3.11 | 0.36 | 48:50-50:06 | 38 | 73 |

Elastomeric latices containing vyniltrimethoxysilane as adhesion promoter (examples 1 to 13) gave enhanced wet adhesion values. Drying time for early rain resistance below 57 minutes were attained consistently, and in some cases, times under 40 minutes were achieved at 38.deg. C. and/4% of RH.

Comparative latices examples including γ-methacryloxypropyl trimethoxysilane or methacrylamidoethylethyleneurea as adhesion promoter (comparative examples a to f), did not yield a significant improvement in wet adhesion property.

In view of the foregoing description and examples the present invention thus relates inter alia to the subject matter of the following clauses though being not limited thereto.

Whereas particular embodiments of this invention have been described above for purposes of illustration, it will be evident to those skilled in the art that numerous variations of the details of the present invention may be made without departing from the invention.

The invention claimed is:

1. An elastomeric latex comprising:
  a) a copolymer, the copolymer comprising a reaction product of reactants comprising:
    i) a mono-ethylenically unsaturated monomer having a glass transition temperature less than −20° C.;
    ii) a mono-ethylenically unsaturated monomer having a glass transition temperature greater than 40° C.;
    iii) an N-methylol functional ethylenically unsaturated monomer; and
    iv) an adhesion promoter comprising an ethylenically unsaturated alkoxysilane monomer;
  b) a photoinitiator; and
  c) an aqueous medium.

2. The elastomeric latex of claim 1 wherein i) is present in an amount of 55 to 85 wt. %; ii) is present in an amount of 10 to 40 wt. %; iii) is present in amount of 1 to 10 wt. %; iv) is present in an amount of 0.1 to 2 wt. %, all weight percents based on total solids weight of the reactants.

3. The elastomeric latex of claim 1 wherein (i) the mono-ethylenically unsaturated monomer having a glass transition temperature less than −20° C. is present in an amount of 70 to 85 wt. %; (ii) the mono-ethylenically unsaturated monomer having a glass transition temperature greater than 40° C. is present in an amount of 10 to 30 wt. %; (iii) the N-methylol functional ethylenically unsaturated monomer is present in an amount of 1.5 to 5 wt. %; and (iv) the adhesion promoter is present in an amount of 0.1 to 1.9 wt. % all weight percents based on the total solids of the reactants.

4. The elastomeric latex of claim 1, wherein the mono-ethylenically unsaturated monomer having a glass transition temperature less than −20° C. comprises a non-functional acrylic monomer.

5. The elastomeric latex of claim 4, wherein the non-functional acrylic monomer comprises butyl acrylate, isobutyl acrylate, isodecyl methacrylate, lauryl methacrylate, tridecylmethacrylate, 2-ethylhexyl acrylate or combinations thereof.

6. The elastomeric latex of claim 1, wherein the mono-ethylenically unsaturated monomer having a glass transition temperature greater than 40° C. comprises vinyl halides, alkenyl aromatic monomers, styrene, p-methyl styrene, o-methyl styrene, o,p-dimethyl styrene, o,p-diethyl styrene, isopropyl styrene, t-butyl styrene, o-methyl-p-isopropyl styrene, methacrylamide or combinations thereof.

7. The elastomeric latex of claim 1, wherein the N-methylol functional ethylenically unsaturated monomer comprises N-methylol acrylamide, N-methylol methacrylamide, or combinations thereof.

8. The elastomeric latex of claim 1, wherein the adhesion promoter comprises vinyl trimethoxysilane, vinyl triethoxysilane, vinyl-tris-(2-methoxyethoxy) silane, or combinations thereof.

9. The elastomeric latex of claim 1, wherein the reaction product further comprises an acid functional monomer present in an amount of 0.5 to 3 wt. % based on the total solids content of the reactants.

10. The elastomeric latex of claim 9, wherein the acid functional monomer comprises acrylic acid, methacrylic acid or itaconic acid, or combinations thereof.

11. The elastomeric latex of claim 1, wherein the photoinitiator is present in an amount less than 5 wt. % based on the total solids of the latex.

12. The elastomeric latex of claim 1, wherein the photoinitiator comprises an aromatic ketone.

13. The elastomeric latex of claim 1, wherein the solids content of the latex is from 40 to 65 wt. % based on the total of components of the latex.

14. The elastomeric latex of claim 1, wherein the aqueous medium is present in an amount of 35 to about 60 wt. % based on the total of components of the latex.

15. The elastomeric latex of claim 1, wherein the latex has a glass transition temperature less than −5° C.

16. The elastomeric latex of claim 1, wherein the latex has a glass transition temperature less than −9° C.

17. A coating composition, comprising the latex of claim 1.

18. A substrate coated with the coating composition of claim 17.

19. The elastomeric latex of claim 12, wherein the aromatic ketone comprises benzophenone and its derivatives, isopropylthioxantone, hydroxyalkylphenone, benzildimethylketal, alkyl-benzoin ethers, acetophenone, or combinations thereof.

* * * * *